United States Patent
Bresson et al.

[15] 3,664,245
[45] May 23, 1972

[54] CAMERA APPARATUS FOR CONTROLLING DIAPHRAGM AND SHUTTER SPEED

[72] Inventors: Richard J. Bresson; Richard C. Painton, both of Rochester, N.Y.

[73] Assignee: Eastman Kodak Company, Rochester, N.Y.

[22] Filed: June 22, 1970

[21] Appl. No.: 48,364

[52] U.S. Cl. ...........................95/10 CD, 95/10 CT, 95/64 D
[51] Int. Cl..........................................G03b 7/08, G03b 9/07
[58] Field of Search........................................95/10 C, 64 D

[56] References Cited

UNITED STATES PATENTS

| | | | |
|---|---|---|---|
| 3,538,823 | 11/1970 | Wagner | 95/10 C |
| 3,232,192 | 2/1966 | Stimson | 95/10 C |
| 3,427,941 | 2/1969 | Metzger | 95/64 D X |
| 3,292,516 | 12/1966 | Sato et al. | 95/10 C |
| 3,464,332 | 9/1969 | Davison et al. | 95/64 D |
| 3,547,018 | 12/1970 | Haberle | 95/10 C |
| 3,554,104 | 1/1971 | Winkler et al. | 95/10 C |

Primary Examiner—Samuel S. Matthews
Assistant Examiner—Michael L. Gellner
Attorney—Robert W. Hampton and William F. Delaney, Jr.

[57] ABSTRACT

An exposure control system for use in photographic apparatus which provides automatic adjustment of the exposure aperture in response to a first photoresponsive signal before and during an exposure interval determined by a timing circuit as a function of the aperture adjustment and a second photoresponsive signal. Preferably the system includes an indicator controlled by both photoresponsive signals to provide an indication of low light conditions and of the termination of the exposure interval when such low light conditions prevail.

5 Claims, 3 Drawing Figures

RICHARD J. BRESSON
RICHARD C. PAINTON
INVENTORS

BY *William F. Delaney, Jr.*

*Robert W. Hampton*

ATTORNEYS

CAMERA APPARATUS FOR CONTROLLING DIAPHRAGM AND SHUTTER SPEED

CROSS-REFERENCES TO RELATED APPLICATIONS

Reference is made to commonly assigned, copending U.S. application Ser. No. 48,365 filed on June 22, 1970 in the name of Lenard M. Metzger et al. U.S. application Ser. No. 823,789, filed in the name of Daniel E. Carter et al. on May 12, 1969; and U.S. application Ser. No. 823,426 filed in the names of Daniel E. Carter et al. on May 9, 1969.

BACKGROUND OF THE INVENTION

This invention related to exposure control systems for use in photographic apparatus, such as cameras, and more particularly to an exposure control system in which the exposure aperture and the exposure time are automatically controlled in accordance with the level of scene illumination.

In previous exposure control systems in which an automatic control is provided for determining the length of an exposure interval, provision has been made for the automatic adjustment of the exposure aperture immediately preceding initiation of the exposure interval in accordance with anticipated scene light. Such a system in which the exposure speed is controlled in response to an electronic timing circuit, and the exposure aperture is adjusted to one of a plurality of predetermined discrete aperture sizes by an automatic control system is shown in U.S. Pat. No. 3,464,332, issued to Davidson et al. on Sept. 2, 1969. The system disclosed in that patent preselects one of a plurality of predetermined aperture stops by means of a plurality of blades having different aperture sizes to provide a "gross" adjustment according to the level of anticipated scene illumination prior to initiation of the exposure interval. However, the use of such a diaphragm control system adjustable only to discrete aperture stops prevents adjustment of the exposure aperture during the exposure interval and does not provide compensation for focus adjustment changes after the aperture has been set but prior to initiation of the exposure interval.

SUMMARY OF THE INVENTION

It is an object of this invention to provide an improved automatic exposure control system that automatically adjusts an exposure aperture prior to initiation of an exposure interval, and continues to control the adjustment of the exposure aperture during the exposure interval, the length of which is determined by a time-delay circuit in accordance with the level of scene illumination.

It is another object of this invention to provide an improved indicator system incorporated in such an exposure control system for providing a low light signal when the scene illumination is below a predetermined level, and for providing a "shutter-open" signal during exposures made in such low light conditions.

It is a further object of this invention to provide such an improved indicator system which activates an indicator prior to and during an exposure interval when low light conditions exist, and which deactivates the indicator in synchronization with the termination of the exposure interval to indicate when the shutter has closed for long exposures in low light conditions.

An exposure control apparatus according to a preferred embodiment of the present invention comprises photoresponsive means for providing two electrical output signals related to the level of illumination incident thereon from an object scene, a diaphragm member movable to any position along a path to vary the size of an exposure aperture, a diaphragm control circuit for adjusting the diaphragm means in response to one of the output signals of the photoresponsive means, shutter means actuatable after activation of the diaphragm control circuit to initiate an exposure interval while the diaphragm means is controlled by its control circuit, and a time-delay circuit for establishing the length of the exposure interval as a function of the diaphragm adjustment and the other output signal from the photoresponsive means.

Preferably, an exposure control apparatus according to this invention includes indicator means and an indicator-control trigger circuit that is activated when the first signal from the photoresponsive means is below a predetermined value. The indicator means according to the preferred embodiment of the invention is associated with both the indicator-control trigger circuit and the time-delay circuit in such a manner that the indicator is activated prior to an exposure interval when the level of scene illumination is below a predetermined level, and it remains activated until termination of the exposure interval to indicate when the shutter has closed for long exposures in low light conditions.

The use of a diaphragm member that is movable to any position along a path to vary the size of the exposure aperture, rather than a diaphragm that is adjustable between several predetermined stop positions, permits adjustment of the diaphragm during the exposure interval in cameras of the type in which the photocell receives light transmitted through the camera objective, since the aperture size can be varied without blocking the exposure aperture during such automatic diaphragm adjustment. Such a diaphragm mechanism also permits adjustment of the diaphragm to compensate for focusing adjustments made after the exposure control system has been activated, but prior to initiation of the exposure interval. In addition such a system can adjust the exposure aperture to compensate for rapid changes in the level of scene illumination during an exposure interval.

An exposure control apparatus according to the present invention is adapted for exposures in artificial light, as well as in ambient scene light. For photographic exposures made in artificial light, such as with a flashbulb, the exposure aperture can be adjusted according to the focus setting, or it can be adapted for automatic adjustment to a predetermined aperture setting. Preferably, insertion of a flashbulb into a camera socket automatically overrides the diaphragm control circuit and mechanically couples the diaphragm means with a focus adjusting means on the camera, since light from an artificial source is a function of the intensity of the source as well as the distance between the object scene and the light source which is usually at the camera.

BRIEF DESCRIPTION OF THE DRAWINGS

The detailed operation of the preferred embodiment of this invention can be described more completely with reference to the accompanying drawings in which:

FIG. 3 shows an elevated view of the surface of a photoresponsive means which can be used in the exposure control circuit shown in FIG. 2.

DETAILED DESCRIPTION OF THE INVENTION

An exposure control system according to the present invention includes an adjustable diaphragm mechanism including a member movable to any position along a path for varying an exposure aperture in accordance with the level of scene light, and a shutter mechanism controlled by an electronic time-delay circuit that establishes the length of an exposure interval. The time-delay circuit preferably is of the integrating type for continuously measuring the total accumulated amount of light energy impinging on a photoresponsive member in the timing circuit. After the diaphragm mechanism has been actuated to adjust the exposure aperture in accordance with the level of scene illumination, the shutter mechanism is then actuated to initiate an exposure interval under the control of the electronic timing circuit that terminates the exposure interval in accordance with the exposure aperture adjustment and in accordance with the amount of illumination actually received during the exposure interval by the photoresponsive member in the timing circuit. The shutter timing circuit can compensate for the exposure aperture setting, for example, by adjustment of an electrical parameter of the timing circuit to vary its time constant, or preferably by varying the aperture of the photoresponsive member used in the timing circuit in accordance with the adjustment of the exposure aperture by the diaphragm mechanism.

Figure 1:
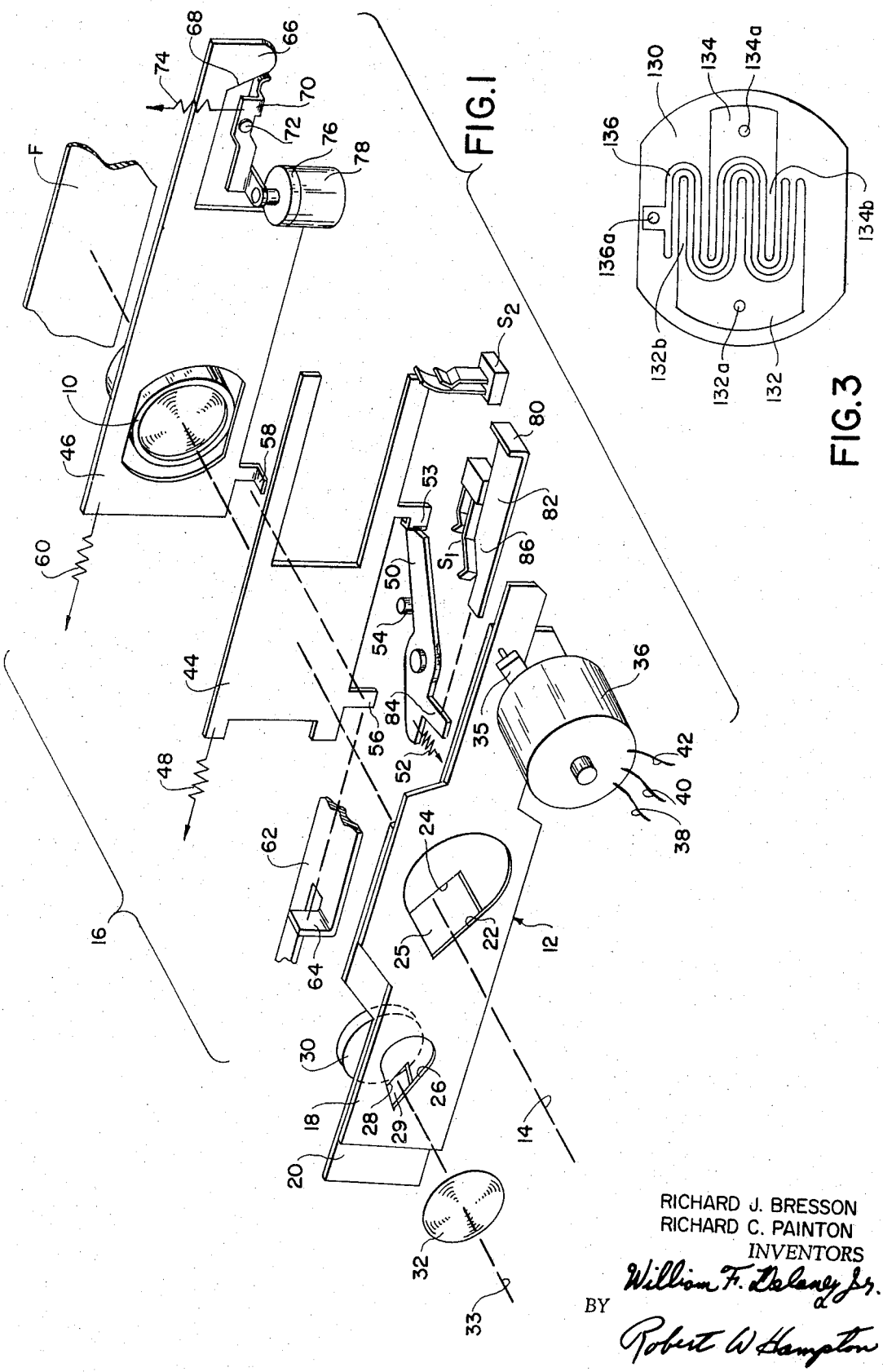
FIG. 1 shows an exploded perspective view of the preferred embodiment of the shutter and diaphragm mechanisms of an exposure control apparatus according to the invention.

Referring now to the accompanying drawings, FIG. 1 shows an exposure control apparatus according to a preferred embodiment of the invention, including an objective 10 for forming an image on photographic film F, a two-bladed diaphragm mechanism 12 for establishing a variable exposure aperture in alignment with the optical axis 14 of the objective, and a two-bladed shutter mechanism 16 for initiating and terminating an exposure through the objective.

Figure 2:
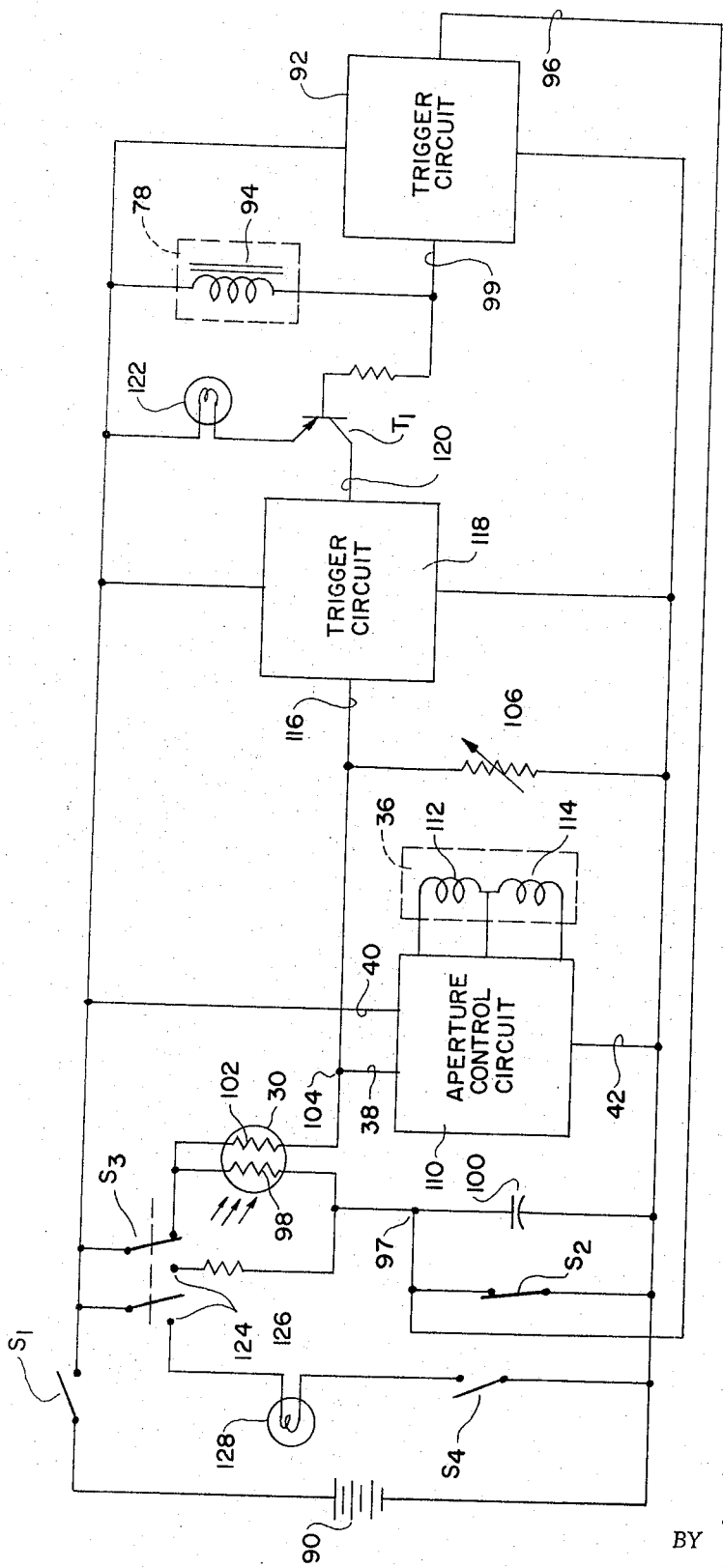
FIG. 2 shows a circuit diagram for controlling the mechanisms shown in FIG. 1, including a time-delay circuit for controlling the exposure time, a diaphragm control circuit and an indicator-control trigger circuit according to the preferred embodiment of the invention.

The diaphragm mechanism 12 includes a pair of blades 18 and 20 that are slidably mounted upon suitable support means (not shown) for equal and opposite movement relative to the lens axis 14. Each of these blades has a tapered aperture 22 and 24, respectively, overlying each other to define an exposure aperture 25 aligned with the optical axis 14. The apertures 22 and 24 are disposed with their tapered portions extending in opposite directions with respect to each other along the line of travel of the two diaphragm blades, such that opposite movement of the blades 18 and 20 will enlarge or diminish the size of the exposure aperture 25. Each of the blades 18 and 20 also has a second tapered aperture 26 and 28, respectively, similar to the tapered aperture 22 and 24, overlying each other to define a second variable aperture 29 overlying a photocell 30. A lens 32 having an optical axis 33 is positioned to form an image of an object scene on the photocell 30 through the variable photocell aperture 29. Thus, opposite movement of the diaphragm blades 18 and 20 will result in a variation of the size of the aperture 29 over the photocell 30 simultaneously with the variation of the size of the exposure aperture 25. The diaphragm blades 18 and 20 are each connected to opposite ends of an armature 35 rotatably driven by an electro-mechanical transducer 36, which in this embodiment is a servo motor having input leads 38, 40 and 42. The operation of this servo motor will be described in further detail with respect to the circuit in FIG. 2 below.

The shutter mechanism 16 is a conventional two-blade system, which is shown in FIG. 1 in its cocked position preparatory to actuation to affect an exposure. The shutter mechanism includes a pair of shutter blades 44 and 46 which are slidably mounted upon suitable support means (not shown) for movement relative to the exposure aperture 25. When the blade 44, which is the "opening" blade in this embodiment, is in its cocked position shown, it is retained against the bias of a spring 48 by a latch member 50 which is biased by a spring 52 into latching engagement with a detent 53, in which position the latch member engages a pin 54. The "opening" blade 44 has a second detent 56 positioned to engage a detent 58 on the blade 46, which in this embodiment is the "closing" blade. Thus, blade 46 is retained in its cocked position against the bias of a spring 60 by the interengagement of the detents 56 and 58. In their respective cocked positions the "opening" blade 44 is retained in a covering relationship with respect to the exposure aperture 25, and the "closing" blade 46 is retained in an uncovering position with respect to the exposure aperture. When the blades are in their respective cocked positions, the spring 48 urges the "opening" blade 44 to an uncovering position with respect to the exposure aperture, and the spring 60 urges the "closing" blade 46 to a covering position over the the exposure aperture.

The "closing" blade 46 also includes a second detent 66 having a cam surface 68 adapted to engage a retaining lever 70 pivotally mounted on a pin 72 and biased by spring 74 in a counterclockwise direction into engagement with the detent 66. The opposite end of lever 70 is connected to an electromagnetic keeper 76 positioned adjacent a pole of an electromagnet 78 when the shutter blade 46 is in its cocked position. The electromagnet 78 is energized and de-energized by an electronic timing circuit discussed in more detail below with respect to FIG. 2. When the electromagnet is energized it holds the lever 70 in its retaining position shown in FIG. 1, to hold the blade 46 in its uncovering position when the detents 56 and 58 become disengaged upon release of the "opening" blade for movement to its uncovering position, thereby initiating an exposure interval. Thereafter, when the electromagnet 78 is de-energized, the bias of spring 60 overpowers the bias of the weaker spring 74 to cause the detent 66 to cam the lever 70 in a clockwise direction, thereby releasing the "closing" blade for movement to a covering position with respect to the exposure aperture and terminate the exposure interval.

For actuation of the shutter mechanism 16 to effect an exposure, it is provided with a shutter actuation button 80 mounted in an external position on the camera so as to be available to a camera operator. The button 80 is mechanically coupled to a rod or bar 82 that is slidably mounted on mounts (not shown) for movement toward engagement with a detent 84 on shutter latch lever 50, when the shutter actuation button 80 is depressed. Initial movement of the slide bar 82 causes a projection 86 thereon to engage a contact of a normally open switch S1, thereby causing the switch to be closed. Continued movement of the slide bar 82 causes it to engage the detent 84 and rotate the latch 50 in a clockwise direction out of engagement with the detent 53 on the "opening" shutter blade 44, thereby releasing the blade for movement under the influence of spring 48 to an uncovering position with respect to the exposure aperture 24 to thereby initiate an exposure interval. When the "opening" blade 44 moves away from its cocked position, it moves out of engagement with one of the contacts of a normally closed switch S2, thereby causing that switch to open.

As shown in FIG. 1 the shutter mechanism is in its cocked position preparatory to actuation of the shutter blade to effect exposure by the operator. When the camera operator depresses the shutter actuation button 80, switch S1 closes energizing the exposure control circuit shown in FIG. 2, then latch 50 is rotated clockwise to release the "opening" blade for movement to its uncovering position with respect to the exposure aperture to thereby initiate an exposure interval and open timing switch S2. When shutter blade 44 moves to its uncovering position, the detent 56 moves out of engagement with the detent 58 on the closing shutter blade 46. However, the electromagnet 78 is energized by the exposure control circuit when the switch S1 is closed, as described below, and latch 70 is held in its retaining position by the electromagnet to prevent the "closing" blade 46 from moving away from its unblocking position. After a period of time determined by the circuit in response to the level of illumination detected by a photoresponsive member in the circuit, the electromagnet 78 is de-energized to release the "closing" blade 46 for movement to its blocking position to terminate the exposure interval. Following an exposure the shutter blades can be returned to their cocked positions by movement of a cocking lever 62 to engage a detent 64 thereon with the detent 56 on the "opening" blade to move the blades back to their cocked position, shown in FIG. 1.

As described above when the shutter actuation button 80 is depressed, switch S1 is closed prior to the release of the "opening" blade. Closure of the switch S1 energizes the circuit, shown in FIG. 2 from a battery source 90. Because of the particular bias voltages established as a result of this closing of the switch S1, a trigger circuit, indicated as block 92, is energized into a conductive state almost instantaneously. When the trigger circuit 92 is in a conductive state, it causes a current through a coil 94 of the electromagnet 78 to retain the "closing" shutter blade 46 in its initial uncovering position after the "opening" blade 44 has moved away from its initial position.

The trigger circuit 92 has an input terminal 96 connected to a junction 97 between a variable photoconductive resistor 98 and a capacitor 100 which are connected in series through a switch S3 and the switch S1 across the battery source 90 to operate as an integrating circuit. The junction 97 is grounded through the switch S2, so that the voltage at the input terminal 96 of the trigger circuit 92 is maintained at ground potential, when switch S2 is closed. However, when the "opening" blade 46 is released from its cocked position, the normally closed switch S2 is opened, as explained above, to cause the capacitor 100 to be charged through the photoresistor 98 at a rate determined by the resistance value of the photoresistor. The photocell 98 is disposed to receive light from a scene being photographed, so that its resistance value is functionally related to the level of scene brightness. Thus, when switch S2 opens, the voltage at 97 changes from its initial ground potential to a predetermined value in a period of time depending on the well-known time constant "RC" of the integrating circuit, which is determined by the value of the capacitor 100 and the value of resistance 98 as established by the intensity of the light from the scene to be photographed. When the voltage at the input terminal 96 of trigger circuit 92 reaches the predetermined value, the trigger circuit is caused to trigger or switch from its conductive state to its nonconductive state thereby causing the electromagnet 78 to rapidly reduce its attracting force on the keeper 76 so as to release the blade 46 permitting it to move to its blocking position under the biasing force of spring 60. Thus the exposure interval is initiated simultaneously with the activation of the integrating circuit by the opening of switch S2, and it is terminated in response to triggering of the trigger circuit 92 after a period of time determined by the integrating circuit according to the illumination incident on the photoresistance 98. Therefore, the time between the release of the blade 44 and the release of blade 46 is dependent upon the value of the resistant 98 in the integrating circuit, which is determined by the level of scene illumination incident thereon. Thus, a high light level under very bright conditions produces a low resistance value of resistance 98 and has a small "RC" time constant for the circuit which results in a short exposure time. Similarly a low level of scene brightness produces a high resistance value and has a longer time constant for the circuit which results in a long exposure time under dim light conditions.

A voltage divider circuit, including a second photoresistor 102 in series with a variable resistance 106, is connected in parallel with the integrating circuit. The voltage divider is connected through switches S3 and S1 across the battery source 90 to provide a voltage at a junction 104 that is functionally related to the level of illumination incident on the photoresistor 102. Connected to the junction 104 is an input terminal 38 of an aperture control circuit shown as block 110 having bias potential leads 40 and 42, which is energized when switch S1 is closed to actuate oppositely poled drive coils 112 and 114 of servomotor 36 which are selectively energized according to the input voltage. The aperture control circuit can be a differential amplifier, such as disclosed in commonly assigned, copending U.S. patent application Ser. Nos. 823,426 or 823,789, filed in the names of Daniel E. Carter et al. on May 9, 1969 and May 12, 1969, respectively. Other examples of control circuits that can be used to control the aperture according to this invention are disclosed in U.S. Pat. No. 3,427,941 issued to L. M. Metzger on Feb. 18, 1969. When switch S1 is closed, the armature 35 of the servomotor 36 is rotated by the drive coils 112 and 114 to adjust the diaphragm blades 18 and 20 in respectively opposite directions to increase or decrease the exposure aperture to a size suitable for the level of illumination incident on the photoresistor 102. This adjustment of the exposure aperture continues after the switch S2 is opened to initiate the exposure interval, and continues until the switch S1 is reopened by release of the shutter actuation button 80. Thus, the exposure aperture is adjusted before an exposure interval and during the exposure interval to correct for any changes in illumination during the exposure interval.

Also connected to the junction 104 is an input terminal 116 of a second trigger circuit, indicated on block 118, for controlling an indicator circuit. The output terminal 120 of the trigger circuit 118 is connected to the collector of a PNP transistor T1. The base of the transistor T1 is connected to the output terminal 99 of the shutter control trigger circuit 92, and the emitter of the transistor T1 is connected in series with an indicator lamp 122 through switch S1 to the battery source 90. The trigger circuit 118 is adapted to be switched between a conductive state when the voltage at the junction 104 is below a predetermined value, and a nonconductive state when that voltage is above that predetermined value. When the switch S1 is closed and the trigger circuit 92 is energized to a conductive state, the transistor T1 is biased into a conductive state so that lamp 122 is energized if the trigger circuit 118 is rendered conductive in response to a low scene light condition. When the lamp 122 is energized to indicate low scene light, it remains activated until the shutter control trigger circuit is de-activated to a nonconductive state at the termination of an exposure interval. Thus, the lamp 122 remains energized through the exposure interval, and it is turned off when the exposure interval is terminated. Accordingly, the transistor T1 functions as an AND gate, so that the lamp 122 is turned on only when both trigger circuits 92 and 118 are activated to their conductive states. This arrangement enables the lamp 122 to provide a low light signal, as well as a "shutter-open" signal when a low light condition will result in a long exposure time. On the other hand, when the level of scene light is above a predetermined value, the trigger circuit 118 is not energized to a conductive state and the indicator lamp 122 remains off. Although no "shutter-open" signal is provided in this latter situation, such a signal is not necessary since the shutter speed is relatively fast.

Several types of well-known trigger circuits are suitable for use as the trigger circuits 92 and 118. A Schmidt trigger is one example of such a typical prior art circuit. Further description of the details of the trigger circuits 92 and 118 is considered unnecessary, since their structure and switching function are well known in the prior art.

Preferably the photoconductive cells 98 and 102 are constructed as two independent photoconductive portions of a single structure. An example of such a structure is shown in FIG. 3 in which the photocell includes a layer of photoconductive material on which is located three discrete electrodes 132, 134 and 136, connected respectively to three terminals 132a, 134a and 136a. The outer electrodes 132 and 134 include strip portions 132b and 134b, respectively, which are interlined with respect to each other in spaced parallel relation. The center electrode 136 comprises a single elongated strip that undulates between the strip portions of the outer two electrodes in spaced parallel relation with those electrode strip portions. This structure provides a first photoconductive resistance between the terminals 136a and 132a, and a second photoconductive resistance between the terminals 136a and 134a. The photoconductive areas of each of these two discrete photocells are thus defined as two side-by-side undulating paths defining a plurality of alternate strips of photoconductive material in interlined, spaced, parallel relation. This multiple photocell unit provides a single structure for detecting illumination over the entire field of a scene with two photoconductive output signals. For a more detailed description of such a photocell reference is made herein to commonly assigned copending U.S. application Ser. No. 48,365, filed on June 22, 1970 in the name of Lenard M. Metzger et al.

When an exposure is to be made with a photoflash apparatus, the gang switch S3 is switched into contact with terminals 124 to disconnect the photocells 98 and 102 from the battery source 90, and to connect the fixed resistor 126 in series with the timing capacitor 100, and to connect a second indicator lamp 128 across the battery source 90 through switches S4 and S1. The fixed resistance 126 in series with the timing capacitor 100 provides a predetermined shutter speed for flash operation. Preferably the switch S3 is actuated to engage contact 124 automatically in response to insertion of a photoflash apparatus on the camera. The switch S4 can be connected to means for sensing the presence of a flashbulb that is in condition for firing. For example a detector can be adapted to sense the presence or absence of a firing pin in a percussive type of flashlamp, and to close switch S4 when such a firing pin has been displaced from its energized position for indicating that the flashlamp is "dead." When the camera is used with photoflash apparatus, the aperture can be adapted for adjustment by the aperture control circuit to a nominal position, or it can be adapted for adjustment by a mechanical coupling with the focusing mechanism on the camera in a manner well known in the art. See, for example, U.S. Pat. No. 3,194,132.

The invention has been described in detail with particular reference to preferred embodiments thereof, but it will be understood that variations and modifications can be effected within the spirit and scope of the invention.

We claim:

1. In a camera adapted to expose film to scene light, an exposure control apparatus comprising:
   a. photoresponsive means adapted to receive illumination from an object scene for providing simultaneously first and second electrical signals functionally related to the level of scene illumination incident thereon;
   b. diaphragm control means for establishing an exposure aperture and a control aperture operative to pass light to said photoresponsive means, said diaphragm control means including a member movable to any position along a path to vary the size of the exposure aperture and the control aperture;
   c. a diaphragm control circuit coupled with said photoresponsive means and activatable to move said diaphragm member in response to said first electrical signal to adjust the exposure aperture and the control aperture operative thereby to vary the magnitude of said first electrical signal to a value corresponding to a suitable level of illumination incident on said photoresponsive means;
   d. means for activating said diaphragm control circuit to adjust the exposure aperture;
   e. actuatable shutter means for covering and uncovering said exposure aperture;
   f. activatable time-delay circuit means, coupled with said photoresponsive means for producing a control signal a period of time after activation of said time delay circuit means, said time delay circuit means including means for establishing the time period as a function of the second electrical signal from said photoresponsive means;
   g. means for actuating said shutter means to uncover said exposure aperture to initiate an exposure interval after activation of said diaphragm control circuit, said diaphragm control circuit being adapted to remain activated to control the position of said diaphragm member during the exposure interval;
   h. means for activating said time-delay circuit in synchronization with the actuation of said shutter means to uncover said exposure aperture; and
   i. means for actuating said shutter means to cover said aperture in response to said control signal to terminate the exposure interval, so that the exposure interval is determined by said time-delay circuit means as a function of the level of scene illumination.

2. The exposure control apparatus claimed in claim 1, wherein said photoresponsive means comprises two photoresponsive members constructed in a single unit.

3. In a camera adapted to expose film to scene light, an exposure control apparatus comprising:
   a. photoresponsive means disposed to receive illumination from an object scene, said photoresponsive means having at least first and second output terminals for providing first and second electrical output signals functionally related to the level of scene illumination incident thereon;
   b. diaphragm means for establishing a variable exposure aperture, said diaphragm means including a member movable to any position along a path to adjust the size of the exposure aperture;
   c. a diaphragm control circuit coupled with said first output terminal, and activatable to adjust the position of said diaphragm member in accordance with the level of scene illumination incident on said photoresponsive means;
   d. means for activating said diaphragm control circuit to adjust the exposure aperture;
   e. shutter means movable between a blocking position in which the exposure aperture is covered and an unblocking position in which the exposure aperture is uncovered to expose film in the camera to scene illumination;
   f. activatable time-delay circuit means, coupled with said second output terminal, for producing a control signal a period of time after activation of said time-delay circuit means, the time period being established as a function of the position of the diaphragm member and the level of scene illumination incident on said photoresponsive means;
   g. means for moving said shutter means to uncover said exposure aperture and for substantially simultaneously activating said time-delay circuit means, after said diaphragm control circuit has been activated, to initiate an exposure interval while the position of said diaphragm member is controlled by said diaphragm control circuit; and
   h. means for moving said shutter means to cover said exposure aperture in response to the control signal from said time delay circuit means to terminate the exposure interval, so that the exposure interval is determined by said time-delay circuit means as a function of scene illumination and the size of the exposure aperture.

4. In a camera adapted to expose film to scene light, an exposure control apparatus comprising:
   a. first and second photoresponsive means adapted to receive illumination from an object scene for providing first and second electrical signals, respectively, each signal being variable as a function of the level of illumination incident thereon;
   b. first electronic circuit means coupled with said first photoresponsive means, and adapted to switch between a first state when the scene illumination is below a predetermined level, and a second state when the scene illumination exceeds said predetermined value;
   c. second electronic circuit means coupled with said second photoresponsive means, said second circuit means being activatable and adapted to switch from a first state to a second state a period of time after activation thereof, the time period being established as a function of the level of scene illumination;
   d. shutter means for covering and uncovering the exposure aperture;
   e. means for actuating said shutter means to uncover said exposure aperture to initiate an exposure interval;
   f. means for activating said second circuit means substantially in synchronization with the actuation of said shutter means to uncover said exposure aperture;
   g. means for actuating said shutter means to cover said exposure aperture in response to switching of said second circuit from said first state to said second state to terminate the exposure interval, so that the exposure interval is determined by said second circuit means as a function of the level of scene illumination; and
   h. an indicator circuit including signal means, said indicator circuit being connected to said first and second circuit means, and adapted to activate said signal means when both of said circuits are in their respective first states to provide a signal when the scene illumination is below a predetermined value, said signal being activated before and during an exposure interval to also provide an indication of the length of the exposure interval.

5. In a camera adapted to expose film to scene light, an exposure control apparatus comprising:
   a. photoresponsive means adapted to receive illumination from an object scene for providing first and second electrical signals functionally related to the level of scene illumination incident thereon;
   b. diaphragm means for establishing an exposure aperture, said diaphragm means including a member movable to any position along a path to vary the size of the exposure aperture;
   c. a diaphragm control circuit coupled with said photoresponsive means and activatable to move said diaphragm member in response to said first electrical signal to adjust the exposure aperture to a size suitable for the level of illumination incident on said photoresponsive means;
   d. means for activating said diaphragm control circuit to adjust the exposure aperture;
   e. actuatable shutter means for covering and uncovering said exposure aperture;
   f. a first trigger circuit coupled with said photoresponsive means, said circuit being activatable and adapted to switch from a first state to a second state a period of time after activation of said trigger circuit, the time period being established as a function of the position of the diaphragm member and the second electrical signal from said photoresponsive means;
   g. means for actuating said shutter means to uncover said exposure aperture to initiate an exposure interval after activation of said diaphragm control circuit, said diaphragm control circuit being adapted to remain activated to control the position of said diaphragm member during the exposure interval;
   h. means for activating said first trigger circuit in synchronization with the actuation of said shutter means to uncover said exposure aperture;
   i. means for actuating said shutter means to cover said aperture in response to switching of said first trigger circuit to its second state to terminate the exposure interval, so that the exposure interval is determined by said first trigger circuit as a function of the level of scene illumination and the size of the exposure aperture;
   j. a second trigger circuit coupled with said photoresponsive means, said trigger circuit being adapted to switch between a first state when said first electrical signal is below a predetermined value, and a second state when said first electrical signal is above said predetermined value; and
   k. an indicator circuit including signal means, said indicator circuit being connected to said first and second trigger circuits, and adapted to activate said signal means when both of said trigger circuits are in their respective first states to provide a signal when the scene illumination is below a predetermined value, said signal being activated before and during an exposure interval and being deactivated at the termination of the exposure interval to provide an indication of the length of the exposure interval.

* * * * *